April 20, 1954 H. HEMMERICH ET AL 2,675,703
STOCKING TESTING DEVICE
Filed July 21, 1951 8 Sheets-Sheet 2
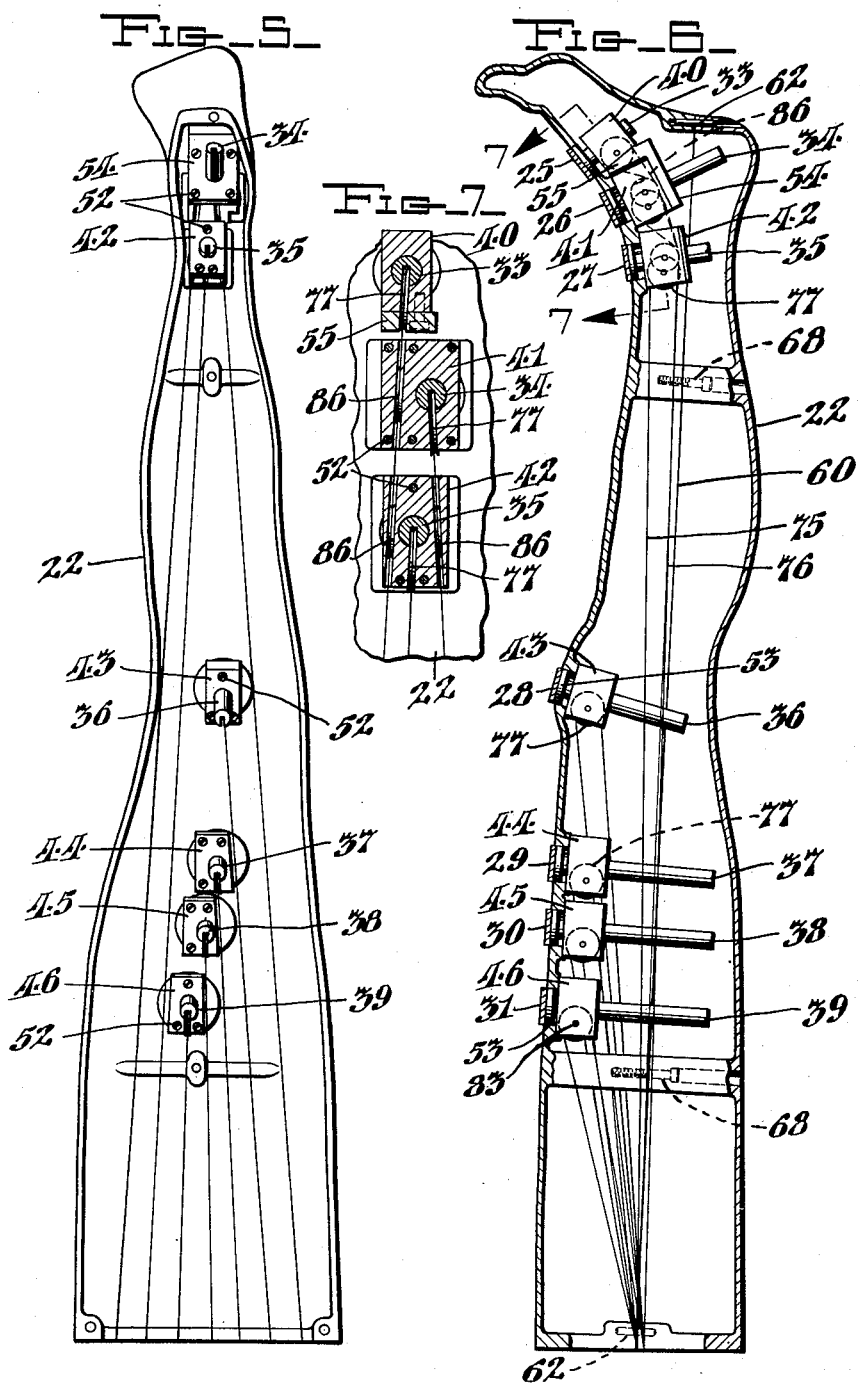
INVENTORS
Hugo Hemmerich
William E. Sheeler &
Paul O. Engter
BY
ATTORNEY

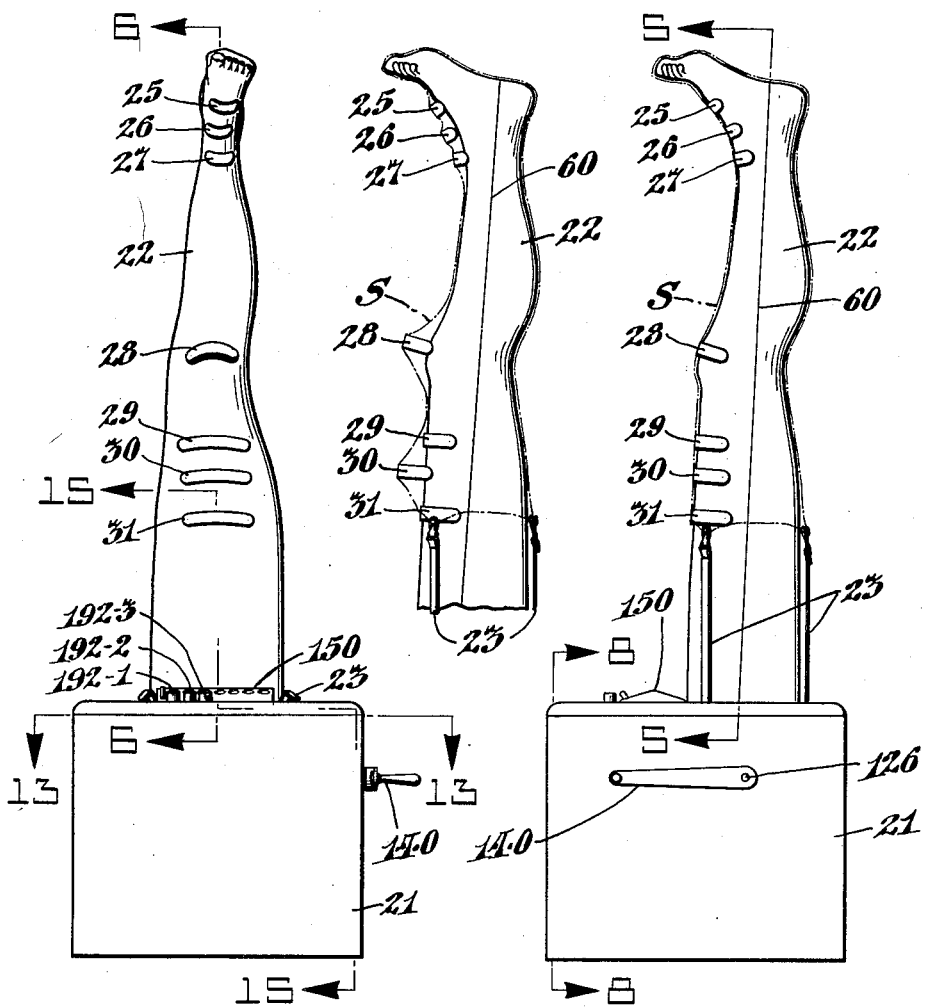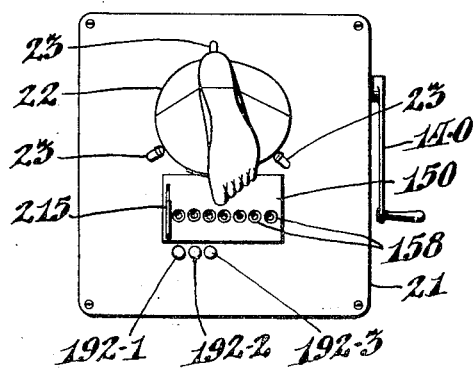

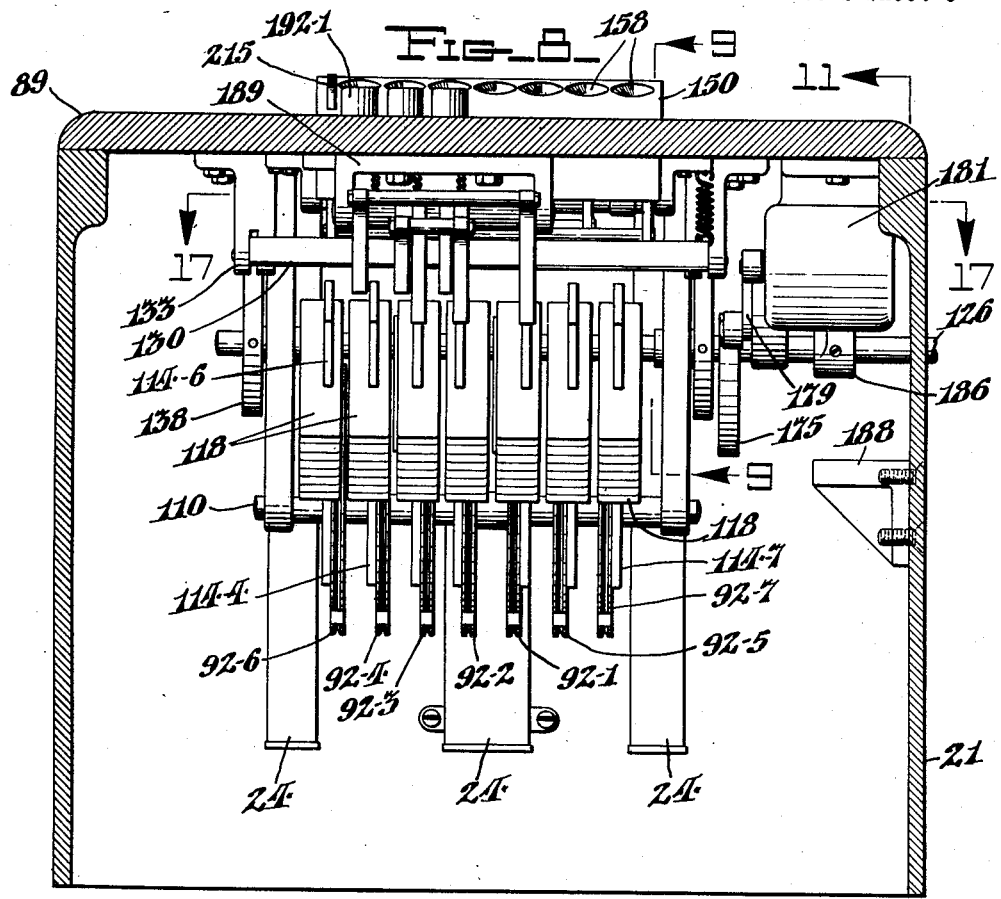
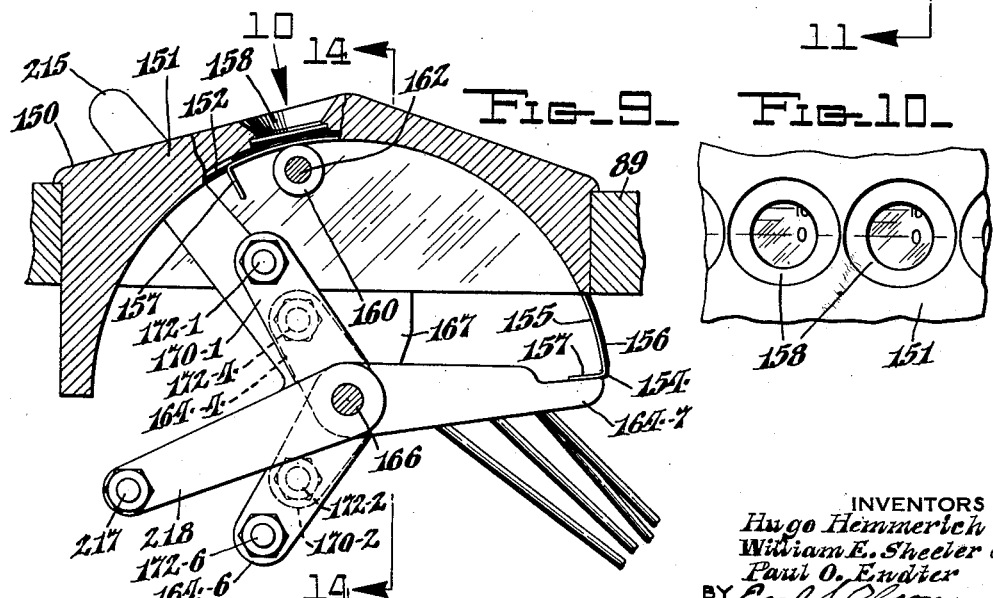

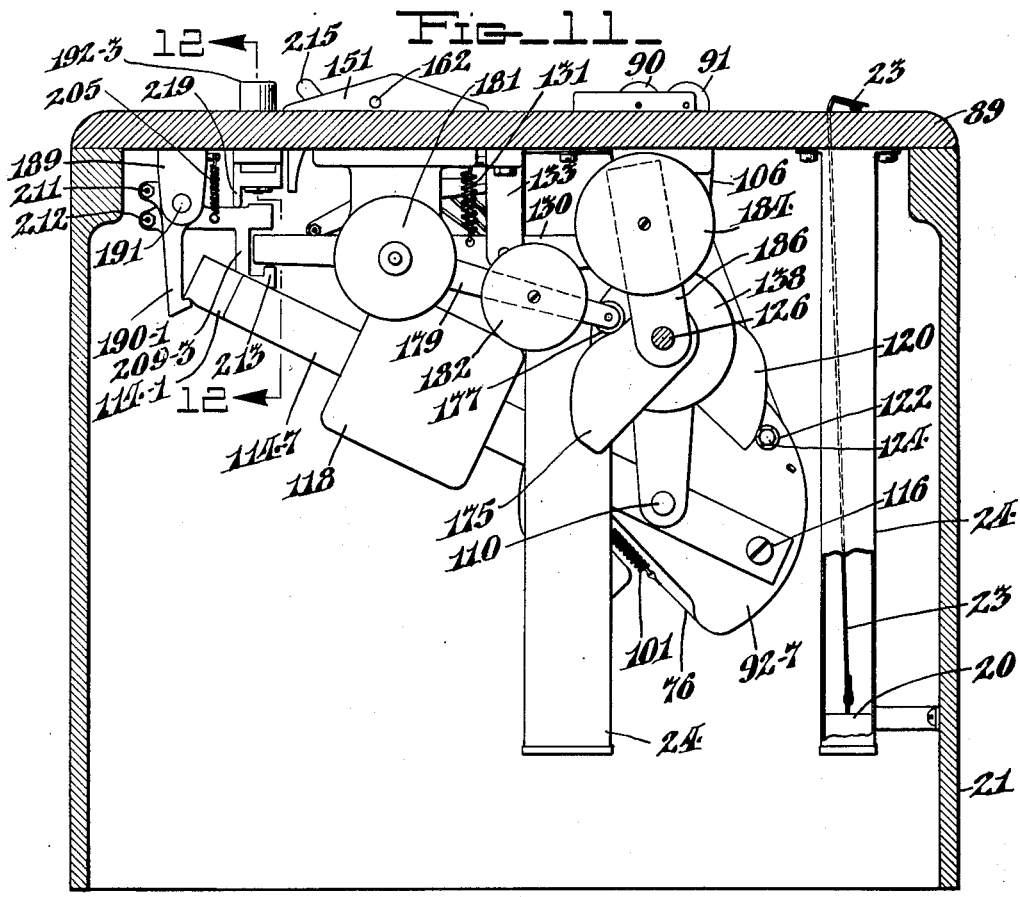
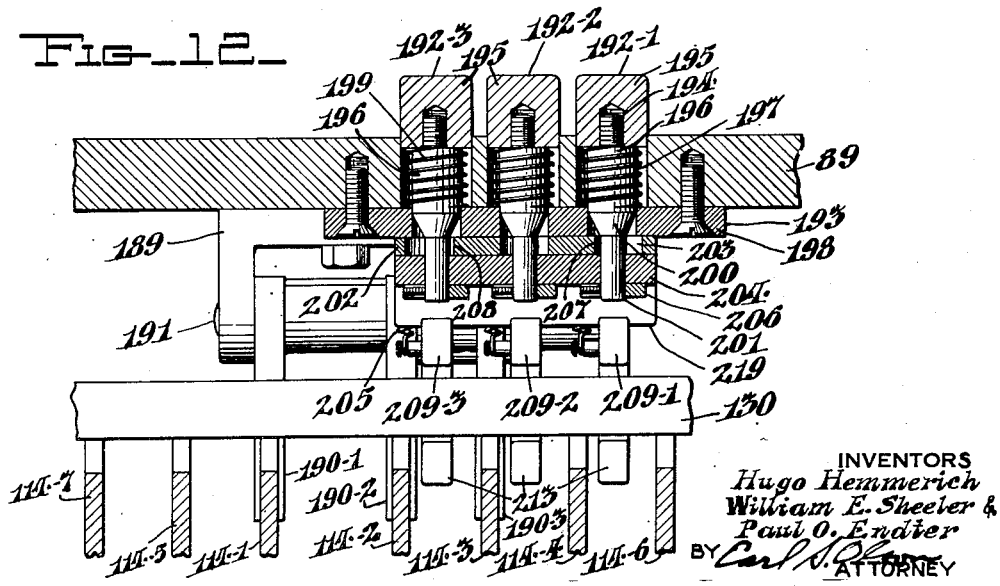

April 20, 1954  H. HEMMERICH ET AL  2,675,703
STOCKING TESTING DEVICE

Filed July 21, 1951.  8 Sheets-Sheet 5

INVENTORS
Hugo Hemmerich
William E. Sheeter &
Paul O. Engter
BY
ATTORNEY

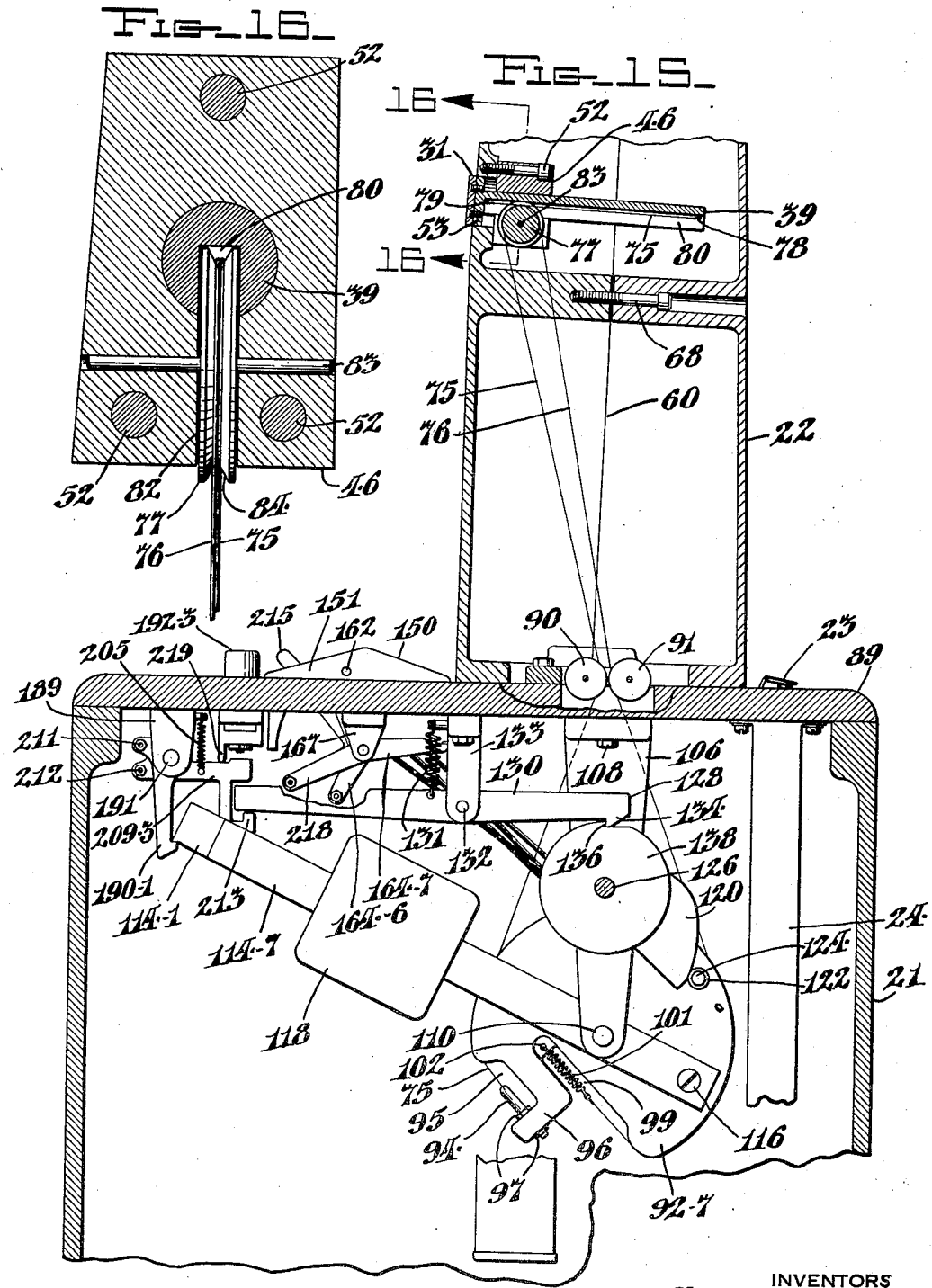

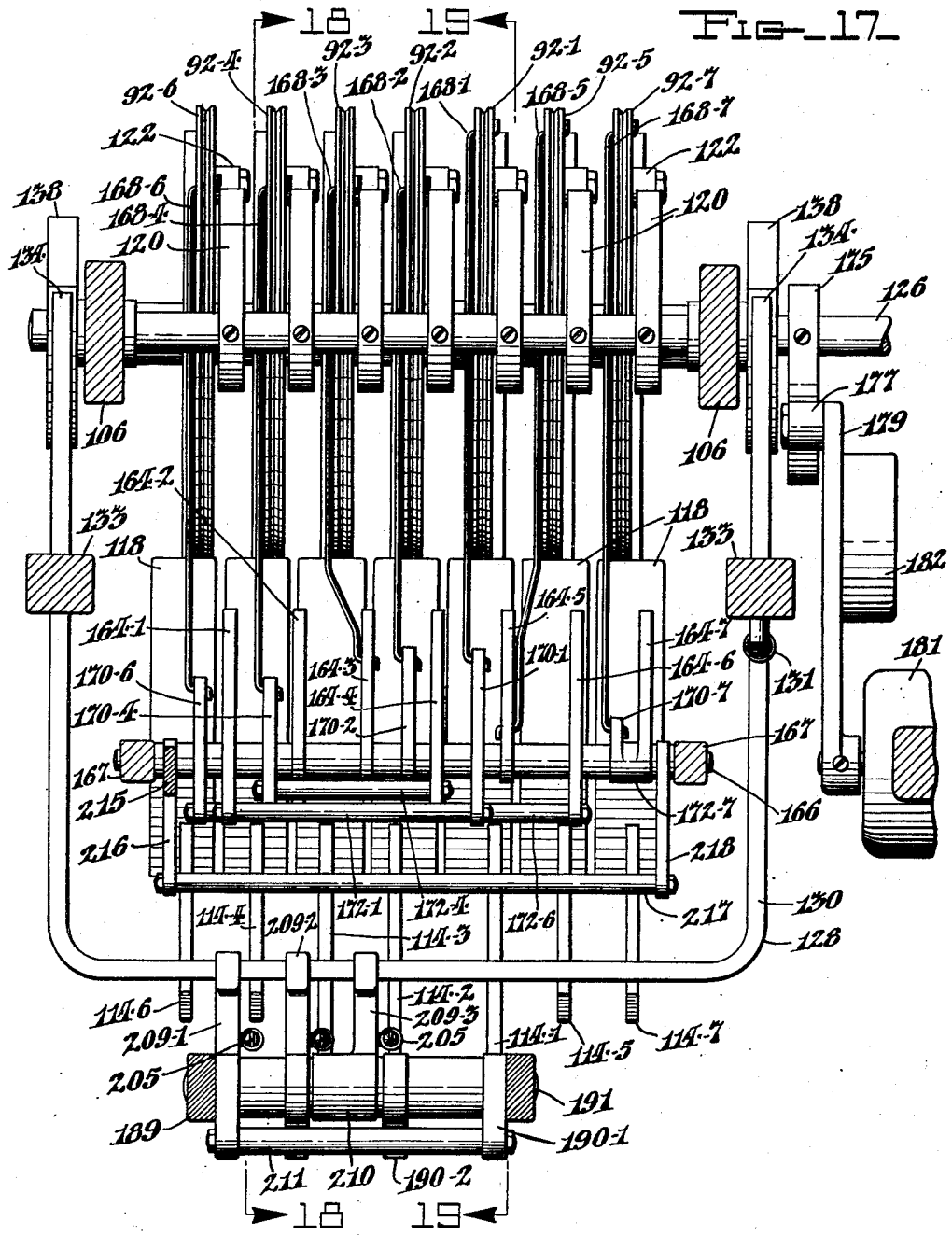

April 20, 1954  H. HEMMERICH ET AL  2,675,703
STOCKING TESTING DEVICE
Filed July 21, 1951  8 Sheets-Sheet 8
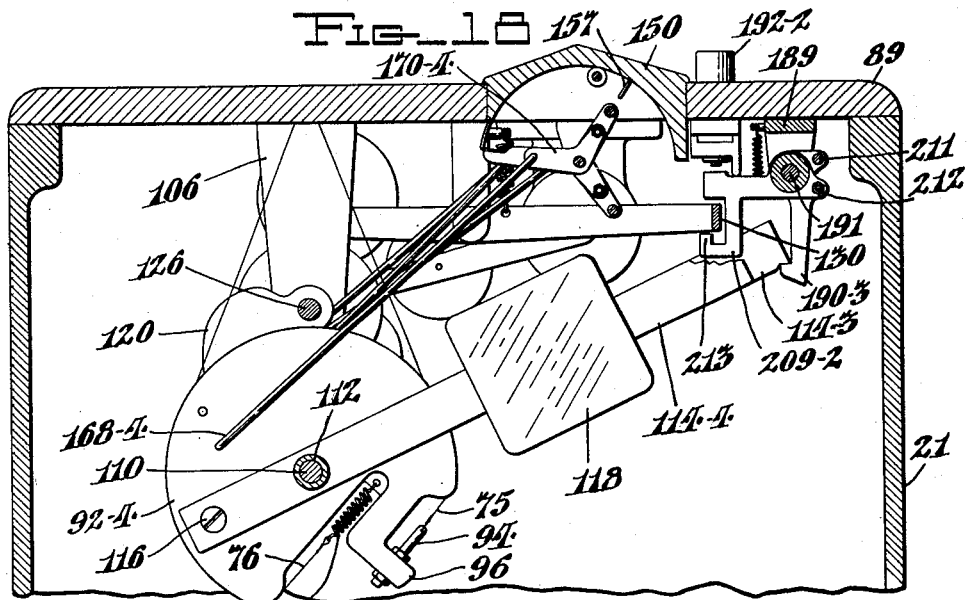
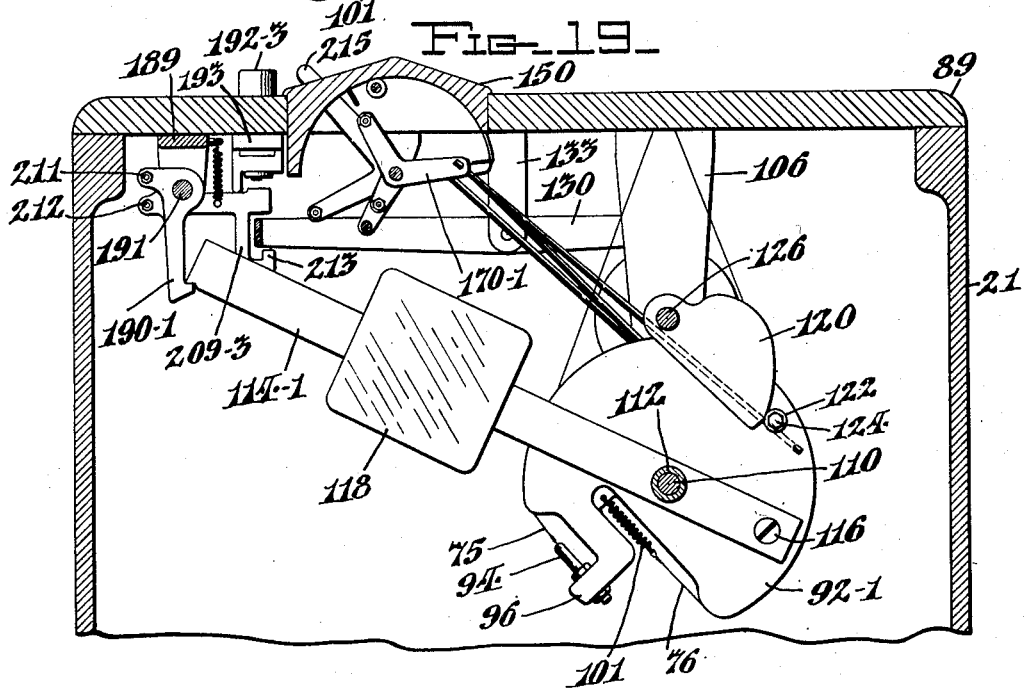
INVENTORS
Hugo Hemmerich
William E. Sheeler &
Paul O. Endter
BY Carl A. Olson
ATTORNEY Patented Apr. 20, 1954

2,675,703

UNITED STATES PATENT OFFICE 2,675,703

STOCKING TESTING DEVICE

Hugo Hemmerich, Reinholds, William E. Sheeler, Wyomissing, and Paul O. Endter, Reading, Pa., assignors, by mesne assignments, to National Association of Hosiery Manufacturers, Inc., a corporation of New York Application July 21, 1951, Serial No. 237,936

19 Claims. (Cl. 73—159)

The present invention relates to apparatus for making tests on hosiery, particularly women's hosiery, for the purposes of determining whether it meets predetermined stretch standards adapting it for use over a reasonable range of different leg contours for a given foot size.

It has been proposed heretofore to subject stockings placed on board-like forms to stretching tests for similar purposes. However, the use of such devices has not proved to give an accurate measure of the stretch characteristics of the stocking due at least in part to the failure of the test to accurately simulate actual conditions of stocking use and to the fact that the stretching forces were necessarily applied over a narrow area of the fabric being tested.

A principal object of the instant invention is the provision of a testing apparatus for the purposes indicated above which includes a contoured leg and foot form made to ideal specifications, that is specifications which typify the average leg, the form having means at a plurality of locations or zones for subjecting the stocking to predetermined stresses, the device also including means to measure the stretch characteristics of the stocking when subjected to such stresses.

Another object of the invention is the provision of a testing apparatus including a contoured hollow leg and foot form of the type referred to, the apparatus having means for holding the stocking under longitudinal or walewise tension simulating the elastic garter attachment employed in the use of the stocking.

A further object of the invention is the provision of a testing apparatus including means for applying stretching stresses to the stocking, for measuring the amount of stretch, and for then relieving the stress on the stocking, the device operating with such speed and efficiency that the stress is relieved before a permanent set is taken by the stocking.

A still further object of the invention is the provision of a testing device adapted to test stockings of different length under relatively identical conditions.

A still further object of the invention is the provision of a stocking testing device including means for applying stretching stresses to the stocking at each of the several locations where special stresses are applied to the stocking in use.

A still further object of the invention is the provision of a stocking testing device including a contoured hollow leg and foot form and pressure members arranged for movement at substantially right angles to the form to press against the fabric, the device being constructed to prevent damage to the stocking under test.

A still further object of the invention is the provision of a device for testing stockings including a series of pressure members mounted for movement outwardly of the stocking form, weight means for thrusting the members outwardly to stretch the stocking and means for initially retarding the movement of the weight members to reduce the suddenness of the thrust or impact of the pressure members against the stocking fabric.

A still further object of the invention is the provision of an apparatus for testing stockings including a contoured hollow leg and foot form having means for applying longitudinal tension to a stocking on the form, a series of pressure members having stocking contacting means located at different points on the form, weighted means for thrusting the pressure members against the stocking fabric, and means for indicating the extent of movement of the pressure members whereby the stretch of the fabric at the several points may be determined and compared with fixed standards.

A still further object of the invention is the provision of a stocking testing device of the type referred to above, which may be easily and quickly manipulated.

With these and other objects in view, which will become apparent from the following detailed description of the illustrative and practical embodiment of the invention shown in the accompanying drawings, the invention comprises the novel elements, features of construction and combinations of parts in cooperative relationship, as hereinafter more particularly pointed out in the claims.

In the drawings:

Figure 1 is a front elevation of an apparatus according to the invention;

Fig. 2 is a plan of the apparatus shown in Fig. 1;

Fig. 3 is an elevational view of the apparatus shown in Figs. 1 and 2 and taken looking from the right of said figures, showing a stocking, in dot-and-dash outline, to be tested on the apparatus;

Fig. 4 is a view similar to the upper portion of Fig. 3, showing the apparatus as it appears in the act of testing a stocking;

Fig. 5 is a view with a portion of the leg form of the apparatus removed on the line 5—5 of Fig. 3 and taken looking in the direction of the arrows;

Fig. 6 is a view taken substantially on the line 6—6 of Fig. 1, looking in the direction of the arrows, parts being shown in elevation and others in section;

Fig. 7 is a sectional view taken substantially on the line 7—7 of Fig. 6;

Fig. 8 is a view taken substantially on the line 8—8 of Fig. 3, looking in the direction of the arrows, parts being shown in elevation and others shown in section;

Fig. 9 is a sectional detail view of a portion of the apparatus shown in Fig. 8 and taken substantially on the line 9—9 of Fig. 8, looking in the direction of the arrows, parts being broken away for purposes of illustration;

Fig. 10 is a fragmentary detail of a portion of Fig. 9 taken looking in the direction of the arrow 10 in Fig. 9;

Fig. 11 is an elevational view taken looking in the direction of the arrows on the line 11—11 of Fig. 8, parts being in section and others being broken away for purposes of illustration;

Fig. 12 is a fragmentary view taken substantially on the line 12—12 of Fig. 11 and looking in the direction of the arrows;

Fig. 15 is a sectional view taken substantially on the line 15—15 of Fig. 1, looking in the direction of the arrows, parts being shown in elevation and others in section;

Fig. 16 is a fragmentary sectional view on a much enlarged scale taken substantially on the line 16—16 of Fig. 15, looking in the direction of the arrows;

Fig. 17 is a view taken substantially on the line 17—17 of Fig. 8 and enlarged relative to Fig. 8, parts being shown in plan and others in section;

Fig. 18 is a sectional view taken substantially on the line 18—18 of Fig. 17, looking in the direction of the arrows; and Fig. 19 is a sectional view taken substantially on the line 19—19 of Fig. 17, looking in the direction of the arrows.

Figure 13:
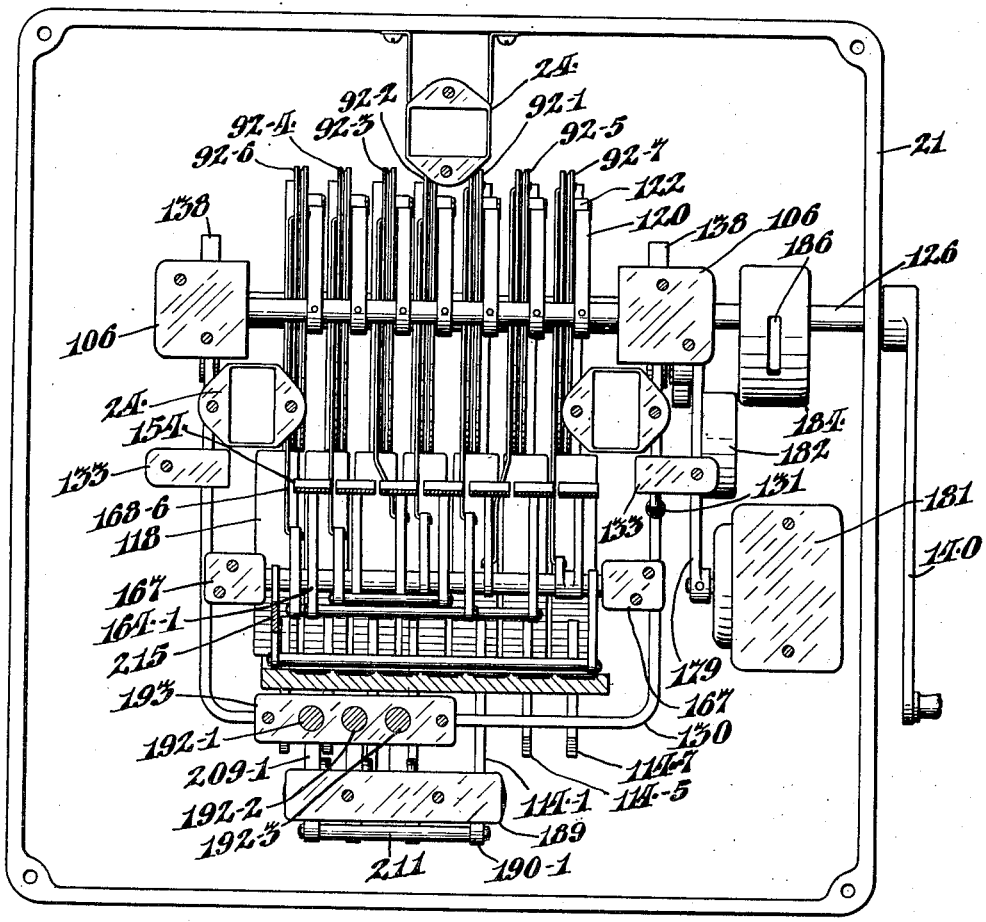
Fig. 13 is a plan view partly in section taken substantially on the line 13—13 of Fig. 1.

The apparatus for testing stockings disclosed herein and hereinafter described in detail, includes a naturally contoured or dimensioned leg form, that is one made to the average contour or dimensions of women's legs, and means associated therewith for applying stretching forces to different locations of the stocking fabric on the form and for measuring the amount of stretch. In the operation of the testing apparatus the stocking is placed on the form, the stretching force applied, and the amount of stretch at the different locations determined. The amount of stretch is then compared with a predetermined standard to determine whether the stocking under test falls within the allowable range for a satisfactory well-fitting article. The natural contour and dimensions of the leg form are important in securing accurate results as they enable the test to simulate actual conditions of stocking wear.

According to the invention the means referred to above for subjecting different portions of the stocking fabric on the form to stretching stresses, comprises pressure members including relatively rigid strip elements located at certain points along the length of the form. The strip elements are contoured to conform to the underlying area of the form and when not in use lie in contact with the form. The strips have a substantial dimension extending circumferentially of the form (coursewise of the stocking) and a lesser but still appreciable dimension longitudinally of the form (walewise of the stocking). Each strip element is mounted on a plunger adapted to move outwardly and inwardly in a path which is substantially perpendicular to the adjacent surface of the form. Due to the contoured shape of the strip elements, and the construction and arrangement of the plunger, damage to the stocking is avoided both when the stocking is under test and when it is applied to and removed from the form.

As previously mentioned, the several strip elements are spaced longitudinally of the form. In order that the fabric of the stocking in the several different zones may be accurately tested, means are provided to advance the strip elements simultaneously. Also, to insure that the stocking is held with the proper longitudinal tension simulating that of actual use, a garter system is employed. This consists of garters extending longitudinally of the form for attachment to the stocking welt.

The forward movement of the plunger and hence of the strip elements into stretching contact with the stocking is caused by weights moving under the influence of gravity whereby accurate loading is possible. In order to avoid injury to the stocking by the sudden thrust or impact of the strip members as the weights are released, impact reducing or shock absorber means are employed whereby the velocity of movement of the strip members is gradual as the strip members move outwardly. Also, to prevent the pressure members from remaining in their forward positions for such time that the stocking fabric takes a permanent set, means are provided whereby the weights may be quickly returned to their original positions and the strip members returned to their positions in contact with the form. However, the device for registering the extent of movement of the strip members remains at its maximum setting until purposely reset to zero by the attendant.

Referring now to the drawings and more particularly to Figs. 1 and 3, 21 indicates a hollow base on which is mounted an inverted hollow leg form 22 which is constructed to the average measurements of a considerable number of women and therefor has what is here termed a natural contour. Along the front of form 22 is arranged a series of strips or elements each of which extends for a material distance in a direction generally circumferentially of the form. Each strip is contoured the same as the surface of the form so that the strip lies in close contact with the form throughout the length of the strip when in its inactive position. In this position of the strips, a stocking S to be tested may be readily slipped onto the form without danger of damaging it. When a strip is, however, activated to apply a circumferential stress to a zone of the stocking, it is moved outward from the face of the form as shown in Fig. 4.

Preparatory to applying a circumferential stress to a stocking S on form 22, a longitudinal stress is applied to the stocking fabric by garters 23. Garters 23, three of which are shown in Fig. 2, extend down into wells 24 within the base 21. At their lower ends, garters 23 have weights 20 (Fig. 11) fastened thereon, so that the same longitudinal stress will be placed on the fabric irrespective of the length of the stocking S under test.

For applying circumferential stresses to the fabric of a stocking S on form 22 there are shown seven of the strips previously mentioned, said strips being indicated individually as 25 above or opposite the ball of the foot, 26 above or opposite the instep, 27 at or in front of the ankle, 28 at the knee and 29, 30 or 31 at the welt according to the length of the stocking under test. Strip elements 29, 30 and 31 form a group, only one of which is used in any given test. The use of a plurality of strips for the welt area is important because of the increasing practice for knitting mills to supply stockings in three different lengths, short, medium and long, for each foot size. Each of strips or elements 25–31 is mounted at one end of a plunger which is carried within the form 22, as shown in Figs. 6 and 15. The plungers for strips 25–31 are designated 33–39, respectively. The plungers are mounted in blocks, one for each plunger, the blocks being designated 40–46, respectively. Blocks 41–46 are all similarly mounted on pads or thickened portions of the front wall of form 22 by means of screws such as 52, shown in Figs. 5, 15 and 16. In the case of block 40 for plunger 33, however, it is inconvenient to secure the block to the form 22 and therefore means is preferably employed to support block 40 from block 41 this means comprising a plate 54. Plate 54 extends along the inner face or side of block 41 which faces the heel and has a wedge-shaped portion 55 to which block 40 is secured as by screws (not shown). Plate 54 is fastened to block 41 and the block 41 is fastened to the form 22 by means of screws. As perhaps best shown in Figs. 15 and 16 in connection with plunger 39, each of plungers 33–39 is slidably mounted in its respective block in the same manner that plunger 39 is mounted in block 46. Further, each of plungers 33–39 has a flange portion 53 formed on the end thereof (Fig. 15) to which the strips 25–31, respectively, are secured as by screws or other suitable means.

It will be noted that form 22 is split along a plane indicated in Figs. 3, 4 and 6 by a line 60 and lying generally about mid-way between the front and rear faces of the form. The two halves of form 22 are maintained in register with each other by dowel pins 62 and screws 68.

For operating the plungers 33–39 of the circumferentially extending strip elements 25–31, motor and control means is located in the box-like base 21. Connections for operating the individual plungers, such connections being in the form of wires, extend from the motor means in the base into the hollow interior of form 22, as shown in Figs. 5, 6 and 15. A pair of operating wires 75 and 76 lead to each plunger of the group 33–39 and both wires of a given plunger pass around a sheave or pulley 77. As shown in Figs. 15 and 16, the pulley 77 associated with the pairs of wires 75 and 76 for plunger 39 is arranged in a vertical plane passing through the center of the plunger. The wires 75, when tensioned, thrusts the plunger 39 in the direction to move it out of the form and to move the strip element 31 away from the surface of the form to place a stress on a stocking on the form tending to stretch the stocking. For this purpose, the upper edge of pulley 77 extends up into a groove 80 extending longitudinally of the plunger. The pulley 77 is mounted in a slot 82 in the block 46 by means of a pin axle 83, the slot 82 being aligned with the slot 80 in the plunger 39. The pulley 77 has a central groove 84 in its circumference which acts to hold the wires 75 and 76 in proper relation to the plunger and the pulley. The wires 75 and 76 pass over pulley 77 in opposite directions, wire 75 passing from left to right over the pulley, as viewed in Fig. 15 and through the groove 80 to a pin 78 by means of which the wire is secured to the plunger 39. Similarly, wire 76 passes from right to left over the pulley 77 and through the groove 80 to a pin 79 by means of which the wire is secured to the plunger 39. From the foregoing it will be seen that, if the tension on wire 75 is increased and the tension on wire 76 is decreased, plunger 39 will be moved toward the left as viewed in Fig. 15, whereas, if the tension on wire 76 is increased and the tension on wire 75 is decreased, plunger 39 will be moved rightward back to the position shown in Fig. 15. It is to be understood that wires 75 and 76 pass over a pulley 77 in each of the blocks 40–46 and are connected to the respective plungers 33–39 in the same manner.

As is clear from Figs. 5 and 6, the pairs of wires for operating plungers 35—39 all run from the open end of the form 22, one to one side and one to the other side of pulleys 77. However, between the ankle and the toe, it is impracticable to run the wires for operating the plungers direct to the pulleys 77 for the plungers 33 and 34 and therefore blocks 41 and 42 are provided with idler pulleys 86 to carry the wires past the blocks 41 and 42. The wires 75 and 76 for the plunger 33 pass over an idler pulley 86 in the blocks 41 and 42 and the wires 75 and 76 for the plunger 34 extend over an idler pulley 86 in the block 42 (Fig. 7).

As is clear from Figs. 2, 3 and 15, the form 22 is mounted on a plate 89, forming the cover of the base 21, the toe portion of the foot of the form being pointed toward the front of the apparatus. Further, as shown in Fig. 15, the wires 75, 76 of each operating pair extend down within the form to a pair of idler pulleys or sheaves 90, 91. From idler 90, the left hand idler as viewed in Fig. 15, wire 75 inclines leftwardly and downwardly to contact with a relatively large driving pulley or motor wheel 92. Wire 75 extends around a small arc of pulley 92 in a counterclockwise direction to a recess 95 in the pulley 92. The free end of the wire is fastened to a bolt 94 mounted on a portion 96 of wheel 92 and secured in adjusted position by jam nuts 97. The other wire of the pair, wire 76, after contacting pulley 91 inclines to the right as seen in Fig. 15 to contact with and pass over pulley 92 to a recess 99. The end of wire 76 in recess 99 is fastened to a tension spring 101 and the spring is fastened in turn to the body of driving pulley 92 at point 102. As will be recognized the construction provides for transmission of movements of pulley 92 to the plunger 39.

Each of the tension strips 25–31 and its corresponding plunger element 33–39 is connected to a motor wheel such as 92 by a pair of wires 75—76 in the manner described above. All of the motor wheels as well as the controlling means therefor and means for registering the resulting movements of the plunger elements are supported from the cover 89 of base 21. The motor wheels 92 are rotatably supported on an axle 110 by means of sleeves or bushings 112, as shown in Figs. 18 and 19, the bushings also acting to space the wheels from each other. The axle 110 is carried in brackets 106 secured to the under side of plate 89 by bolts 108. Weight levers 114 are also mounted on the sleeves 112 alongside wheels 92, one lever for each wheel. The lever for each wheel is fastened thereto by suitable means such as a screw 116 (Fig. 15). Each weight lever has a weight 118 thereon, preferably mounted for adjustment along the length of the lever 114, which is adapted to turn its lever and motor wheel 92 on shaft 110 in the counterclockwise direction as viewed in Fig. 15, when permitted to do so. Wheels 92 are, however, normally prevented from turning by cams 120, of which there is one for each wheel. Cams 120 are in contact with rollers 122 loosely supported by bolts 124 on the wheels 92. Cams 120 are fixed to a shaft 126 and the effect of weights 118 and of rollers 122 on cams 120 is to turn the shaft 126 clockwise as viewed in Fig. 15, when the shaft is free to turn. Normally, however, shaft 126 is prevented from turning by a latch means 128, shown in Figs. 15 and 17. Means 128 comprises a U-shaped lever 130 the open ended arms of which are pivotally supported on a shaft 132 carried in brackets 133 supported from the under side of plate 89. The free end of each of the arms of U-shaped lever 130 are provided with latch hooks 134, shown in Figs. 15 and 17. Each hook 134 is adapted and arranged to engage a notch 136 in a disk 138 fixed on shaft 126. Therefore, so long as latch hooks 134 are engaged with notches 136 as shown, shaft 126 is latched against movement in a zero position and the parts including cams 120 and wheels 92 controlled thereby remain in such zero position until a test is run on a stocking.

When shaft 126 is released by its latch means 128, the weights 118 would accelerate so rapidly that an undesirable thrust or impact effect would be applied to the fabric of a stocking under test. In order to prevent this, a shock absorber or thrust reducing means is provided comprising a cam 175 fixed to shaft 126 and a lever 179 at the free end of which is a cam follower 177 bearing on cam 175. The other end of lever 179 is connected to the movable member of a fluid type shock absorber 181, of the general type known commercially as "Houdaille," which is supported from the under side of plate 89. Therefore, when the shaft 126 is released by the hooks 134, the shock absorber 181, through lever 179, follower 177 and cam 175 and a weight 182 on the lever 179 resists and retards the turning movement of the weight levers 114. Also fixed on shaft 126 is an arm 186 on which is fastened a weight 184 (Figs. 11 and 13), arm 186 is nearly vertical but its inclination is such that its weight 184 also retards the movement of shaft 126 and weights 118 as they begin to move. However, as movement continues, the shock absorber 181 eases the weights 118 down until their strip members 25–31 begin to tension the fabric. The weight 184, however, has by this time passed over the center or top point in its path and is applying a turning movement to shaft 126 in the same direction, clockwise as in Fig. 15, in which it was turned by followers or rollers 122 when the shaft 126 and weights 118 were first released by latch means 128. Weight 184 therefore moves shaft 126 so that cams 120 are free of rollers 122 so that weights 118 are free to settle to different angular positions as determined by the resistance to circumferential pressure offered by different zones of the fabric. After applying maximum tension to the fabric as determined by the weights 118, the weight 184 continues to turn the shaft 126 until the arm 186 engages a fixed stop 188 (Fig. 8). To facilitate this final turning movement of the shaft 126, the shock absorber is so adjusted to release the resistance exerted by the shock absorber thereby permitting the weight 184 to freely turn the shaft 126. When a handle 140 fixed on shaft 126 outside the base 21 comes to a stop at the same time as weight 184, the attendant immediately turns the handle backward so that no permanent set is produced in the fabric. Cams 120 then act on rollers 122 to restore weights 118 and driving pulleys 92 to their zero positions, weight 182 returns lever 179 to zero position and latch means 128 falls into place to hold the parts inactive until another testing operation. The zero position is assumed for the parts shown in all the figures of the drawings except Fig. 4.

Figure 14:
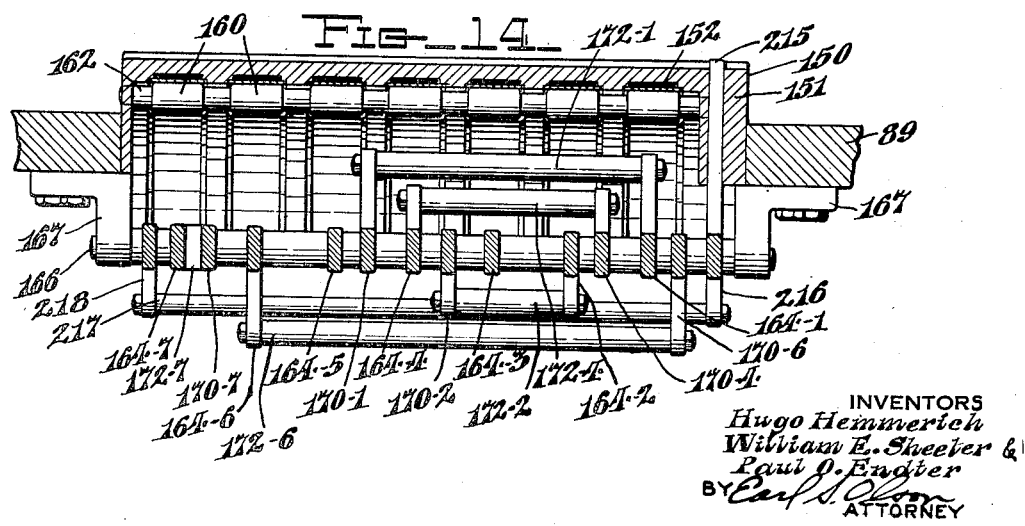
Fig. 14 is a sectional view taken substantially on the line 14—14 of Fig. 9, looking in the direction of the arrows.

A register mechanism 150 is provided for registering the results of stresses applied to stockings through the strip elements 25–31. The register 150 comprises a shell 151 shown in Figs. 9 and 14 the interior surface of which is semicylindrical and the inner face of which has grooves as shown at 152. Each groove receives a two-ply arcuate strip 154 slidably mounted therein. The grooves 152 run in planes at right angles to the axis of the cylindrical surface of member 151 and therefore define arcs of a true circle. This facilitates movement of the strips 154 in grooves 152, a feature whose utility will presently appear. The two-ply strips 154 preferably have the inner ply 155 in the form of a thin metal strip the ends or tips 157 of which are bent to lie radially of the inner surface of member 151. The outer ply 156 of two-ply strip or member 154 is attached to the outer surface of inner ply 155 by an adhesive or the like and the outer surface of outerply 156 is graduated from zero upward in suitable steps. The graduated outer surface of each ply 156 is visible from the outside of the apparatus through one of a series of seven sight holes 158, in member 151 as shown in Fig. 2 and Fig. 9. The inner plies 155 are a little wider than the outer plies 156 and grooves 152 are accordingly made deeper in the portions occupied by outer plies 156 as indicated in Figs. 9 and 14. The two-ply strips 154 are maintained in grooves 152 by contact with enlarged cylindrical portions 160 on a shaft 162 journalled to hold the portions 160 in contact with the inner faces of the strips 154. The strips are preferably preformed to their arcuate contour before being inserted in grooves 152.

The radial tips or end portions 157 on inner plies 155 are utilized to push the strips 154 from the zero positions shown in Figs. 9 and 10 to positions in which a strain reading is visible through sight holes 158 and then back to the zero positions. For operating strips 154 from the zero positions to higher reading positions, a lever 164 is provided for each strip, the lever being pivotally mounted on a shaft 166 mounted substantially at the axis of the inner cylindrical surface of member 151 in brackets 167 secured to the under side of plate 89. Each lever 164 is connected for operation by one of wheels 92. The connections for this purpose are best shown in Fig. 17 in which the various weight wheels are all numbered 92 but with hyphenated digits running from 1 to 7, in the order in which the wheels are operatively connected to strip elements 25–31 respectively. The connections include a group of wires 168, one for each wheel 92. The individual wires in group 168 are given reference character 168 plus a digit, thus 168–1, etc., the digit added in each case corresponding to the digit of the wheel 92 to which the wire is connected at one end. Certain of the wires are directly connected to the levers 164 and the other wires extend from the wheels to connections with levers such as lever 170 pivoted on shaft 166. It is desirable that the movements of strips 25–31 be read in order from left to right, as viewed in Fig. 2, through sight holes 158. However, as the wheels 92 are not and cannot readily be arranged in the order thus required for strips 154, it is necessary in most cases to use the levers 170 and lateral connections from the levers to levers 164 which make direct contact with the strips 154. Thus, wire 168–1 connects at one end with a wheel 92–1 and at its other end with a lever 170–1. Lever 170–1 is pivoted on shaft 166 and extends past the shaft, with its outer end secured to one end of a jumper 172–1. The other end of jumper 172–1 is secured to an extending portion of lever 164–1 whereby movement of lever 170–1 is imparted to lever 164–1. Similarly, wheels 92–2, 92–4 and 92–6 are connected to their levers 164–2, 164–4 and 164–6, respectively, through wires 168–2, 168–4 and 168–6, levers 170–2, 170–4 and 170–6 and jumpers 172–2, 172–4 and 172–6. Levers 164–3 and 164–5, however, are so located with respect to their corresponding operating weight wheels 92–3 and 92–5 that the wires 168–3 and 168–5 are run direct from the wheels to the levers without the need of intermediate levers and jumpers. Wheel 92–7 is connected through wire 168–7 to a lever 170–7 pivoted on shaft or axle 166. Lever 170–7 is so close to lever 164–7 that the two are conveniently arranged so that an impulse is transmitted from lever 170–7 to lever 164–7 through a common hub 172–7 which surrounds shaft 166 and serves as a pivot thereon for both these levers.

As shown in Figs. 11 and 19, the lever 114–1 for weight wheel 92–1 projects beyond the ends of the levers 114–5 and 114–7 for weight wheels 92–5 and 92–7 which lie in front of wheel 92–1 as shown in Figs. 11 and 17. Similarly, in Fig. 18, which is taken looking in the opposite direction on Fig. 17 from Figs. 11 and 19, the weight lever 114–3 for wheel 92–3 projects beyond the end of levers 114–4 and 114–6 for wheels 92–4 and 92–6 which lie in front of it. It will be understood that weight lever 114–2 for wheel 92–2 is similar to lever 114–1 and 114–3 in that it is longer and projects far enough upwardly when held against movement for the upper ends of levers 114–1, 114–2 and 114–3 to be normally latched against movement by latches 190–1, 190–2 and 190–3 of the dog type. The latches 190–1 to 190–3 are pivotally mounted on a shaft 191 carried in a bracket 189 supported from the plate 89, Figs. 9 and 11.

It is desired that only one of plungers 37, 38 and 39 and the respective strip elements 29, 30 and 31 shall operate at the time of testing a given stocking while the remaining plungers 33, 34, 35 and 36 with their corresponding strip elements 25, 26, 27 and 28, respectively, shall not operate at every test run of the apparatus. The control means for this purpose includes three downwardly operating push buttons 192–1, 192–2 and 192–3. As best shown in Fig. 12, these push buttons are slidably mounted in apertures in plate 89 and each comprises a knob 195 filling the aperture and normally standing with its lower edge just within the surface of plate 89. Knobs 195 are screwed onto the upper ends 194 of stems 196 having portions 197 reduced in diameter as compared to knobs 195. The lower ends of portions 197 are slidable in apertures in an upper plate portion 198 of a member 193 fastened to the under side of plate 89. The reduction in diameter of the apertures receiving parts 197 compared to the apertures for receiving knobs 195 provides shoulders on the upper face of plate 198 against which thrust the lower ends of compression springs 199 whose upper ends thrust against knobs 195 to hold them in the upper or released position. Just below the level at which stems 196 enter plate portion 198, stems 196 are bevelled downwardly as shown at 200. The lower ends of bevels 200 stand, as shown, approximately at the level of the lower edge of plate portion 198 and, below this level, the ends of stems 196 are of a uniform reduced diameter as shown at 201. A plate 202 is slidable in an opening formed between the upper plate portion 198 and a lower plate portion 204 of the member 193, the plate 202 having apertures through which the lower ends 201 of stems 196 extend. Apertures 203 in the plate 202 are of the same size as the apertures in plate 198; i. e., approximately the diameter of portion 197. As shown in Fig. 12, only one aperture 203 may be concentrically positioned with respect to its associated stem 196 at any one time, the other two apertures being eccentrically positioned with relation to the corresponding stems 196 so that only one of the push buttons 192 may be operated, as hereinafter set forth. End portions 201 extend below plate 202 and through the lower plate portion 204 of the member 193 with which portions 201 have a sliding fit. The lower ends 201 extend below plate portion 204 and have washers or collars 206 secured thereto, the collars acting to determine the upper or released position to which the push buttons are biased by the springs 199.

Also, means are provided whereby buttons 192–1, 192–2 and 192–3 when operated, are adapted to release respectively latch dogs 190–1, 190–2 and 190–3. The operation of one of said buttons releases not only one of the corresponding weight levers 114–1, 114–2 or 114–3 but also all of the remaining levers 114–4 to 114–7, inclusive, as will hereinafter be more fully explained. To prevent push buttons 192–1 and 192–3 from being depressed at the time button 192–2 is depressed (Fig. 12), the bevelled portions 200 of the outer buttons will strike the shoulders 207 or 208 of the apertures associated with the buttons 192–1 and 192–3. Similarly, if one of the end buttons 192–1 or 192–3 is pressed down, its bevelled portion 200 will act on shoulder 207 or 208 to slide plate 202 to one side and thereby prevent downward movement of the other two push buttons.

As one of buttons 192–1, 192–2 and 192–3 is pushed down the free end 201 thereof contacts one of three combined release and latch levers or members 209–1, 209–2 and 209–3 which correspond each to one of push buttons 192–1 to 192–3. Latch levers 209–1 and 209–2 are pivoted on shaft 191 and are connected to latches 190–1 and 190–2 by jumper rods 211 and 212, respectively. Latch lever 209–3 is part of the hub 210 of the latch 190–3 pivotally carried on the shaft 191. As shown in Figs. 18 and 19, the ends of members 209 removed from jumper rod 212 are bifurcated, the upper portions lying just below button 192 but above lever 130 and the lower potrions 213 having a hooked form and lying below the lever 130. Therefor, as the end of a member 209 contacts the lever 130 to turn it counterclockwise to release the hooks 134 from the disks 138, a latch 190 releases its cooperating lever 114 so that all four of levers 114–4 to 114–7 and the desired one of levers 114–1, 114–2 and 114–3 are all released at once to operate stress applying strips 25–28 and to operate the selected one of strips 29–31. As is apparent from Fig. 15, a spring 131 is provided for returning U-shaped lever 130 to latching or zero position after the pressure on the button is released and springs 205 are provided, one for each of members 209, for returning them to zero position against a stop 219 carried by member 193.

However, as the portion of member 209 contacted by a push button 192 moves down, its hook portion 213 swings back out of the way of lever 130 so that the hook portion will not interfere with the unlatching movement of the lever on its pivot 132. But the two members 209 which are not moved by a button 192 retain the position shown in Figs. 11, 15, 18 and 19 so that the lever 130 enters their hook portions 213 to latch them against movement. The members 209 lying in the path of buttons 192, those that are so latched by lever 130, prevent the release of the two unselected weight rods 114–1, 114–2 or 114–3 either by their push buttons or otherwise. It will be seen, therefore, that there are two means provided for preventing an undesired operation of more than one push button 192 and/or weight lever 114–1, 114–2 and 114–3, one means comprising plate 202 and shown in Fig. 12 and the other means comprising lever 130 and hook portions 213 of latch levers 209.

After the operation of the testing device during which the movements of the weight levers 114 were transmitted to the strips 154 of the register means by levers 164 and associated parts and the weight levers were then restored to their latched positions by handle lever 140, shaft 126 and cams 120, the strips retain the positions to which they were advanced until the attendant has recorded the readings on the strips. He then returns the displaced strips 154 to their zero positions. For this purpose, there is provided a bell-crank lever 215 the upper arm of which extends through a slot in the shell 151 of the register. Lever 215 is pivoted on shaft 166 and has an arm 216 (Fig. 17) within base 21 below shell 151. The end of arm 216 remote from shaft 166 is connected to a rod 217, the other end of which is connected to a lever 218 also pivoted on shaft 166. Therefore, when lever 215 is turned clockwise as viewed in Figs. 9 and 15, rod 217 engages the radial tips 157 nearer the rod to push them and the strips 154 of which they are parts back to their zero positions.

The operation of the testing apparatus will be evident to those skilled in the art from the foregoing description taken in conjunction with the accompanying drawings. However, the operations will be briefly summarized as follows:

A stocking to be tested is drawn on to the hollow leg and foot form 22 supported in its inverted position on base 21, the operation continuing until the stocking is fully extended. No difficulty is involved in the application of the stocking to the form, nor is there any danger in snagging the stocking fabric as strips 25–31 are contoured to the surface of the form and lie closely against it. After the stocking is on the form the garter elements 23 are attached to the welt similarly as garters are attached in normal stocking use. The weights 20 suspended by the garters provide the required degree of tension on the stocking fabric irrespective of the length of the stocking.

One of push buttons 192–1, 192–2 and 192–3 is then pressed to initiate the testing operation. The selection of the proper button is determined by the length of the stocking, i. e., whether it is short, medium or long. In the example illustrated a stocking of medium length is employed and in the following discussion a stocking of this length will be considered as under test. It will be appreciated that the form may, if desired, be marked to indicate the position of the end of the welt for each of the different stocking lengths.

Inasmuch as in the instant example a medium length stocking is under test, push button 192–2 will be selected. Upon depression of the push button its lower end forces its corresponding release and latch lever 209–2 downwardly which in turn engages and rotates lever 130 counterclockwise to release hooks 134 from disks 138. Consequently all of the wheels 92 are released insofar as the holding action of cams 120 is concerned as shaft 126 is now free to rotate in a clockwise direction. Also, lever 114–2 is released from the holding action of latch 190–2 by the downward movement of lever 209–2. Hence wheels 92–2 and 92–4 to 92–7 are permitted to rotate under the influence of their respective weights 118. Wheels 92–1 and 92–3 are, however, still restrained against rotation as latches 190–1 and 190–3 remain in their latching positions.

The rotation of wheels 92–2 and 92–4 to 92–7 causes, through their respective wires 75 and 76, movement of their plungers forwardly to carry strip elements 25 to 28 and 30 into stretching contact with the stocking fabric. The forward movement of each of the strips continues under the action of its weight 118 until the resistance of the stocking to further stretching is equal to the load of the weight.

The initial rotation of each of the wheels 92 is opposed by the thrust reducing means previously described and comprising cam 175 fixed to shaft 126, lever 179 carrying cam follower 177, shock absorber 181, the weight 182 on lever 179 and weight 184. Hence, any sudden impact or thrust of the strips or pressure members against the stocking fabric which might injure the fabric is prevented. However, by the time the pressure members have moved into firm contact with the fabric, weight 184 has passed beyond its vertical position and applies a clockwise turning movement to shaft 126 whereby the retarding system is released from operation and the cams 120 and in particular those for wheels 92–2 and 92–4 to 92–7 in this instance, may rotate freely under the thrust of the weight 184.

Rotation of the wheels 92–2 and 92–4 to 92–7 causes movement of their respective wires 168 which in turn through their respective levers 164 and 170 move the corresponding strips 154 of the register mechanism. The extent of movement of the strips and hence the reading at the sight hole in each case is, of course, controlled by the arc through which the corresponding wheel 92 was rotated which in turn was controlled by the extent of movement of the corresponding pressure member.

As soon as the forward movement of the pressure member has been stopped, or substantially stopped, by the resistance of the fabric when it has reached its approximate elastic limit, this will be noted by the operator and the pressure members retracted and the machine reset in order to insure that the stocking fabric will not become permanently distorted by stretching or drawing of the individual filaments or otherwise under the continued load of the weights. This is accomplished by rotating handle 140, in a direction opposite to the rotation of the shaft 126 under the influence of weight 184, to cause cams 120 to act on rollers 122 to restore both the weights 118 and the driving pulleys to their zero positions and to also cause weight 182 to return lever 179 to its zero position and to cause latch means 128 to fall into place to hold the parts inactive until another testing operation is to begin. Strips 154 remain in their advanced positions giving the operator adequate time to read them through the sight holes 158 and compare the readings with standard readings. When this has been done the operator restores the strips 154 to their zero positions by manipulation of lever 215.

Although, as stated above, the operator may compare the readings of strips 154 with standard readings, it will be appreciated that other more mechanical method of comparison can be used. For example, strips 154 themselves may be marked in any simple way to indicate a zone of allowable stretchability for the stocking under test. Thus, the strips can be marked in sections of different color, a section of one color marking the allowable range of stretchability.

A testing device embodying the instant invention may be easily operated by relatively unskilled persons and accurate determinations made. The device permits the testing of stockings of different lengths under substantially the same conditions. The leg form may be made to ideal dimensions representative of the average women's leg of a given foot size which, together with the wide contact of the strips of the pressure members against the fabric, insures accurate results.

Of course, the improvements specifically shown and described by which the above results are obtained can be changed and modified in various ways without departing from the invention herein disclosed and hereinafter claimed.

I claim:

1. In an apparatus for testing stockings, the combination of a contoured hollow leg and foot form, means for applying stress longitudinally of the form to a stocking thereon, including a series of elements extending through the wall of said form and distributed at fixed points along the length thereof and means operatively connected to each of said elements and extending from a point external to the form and passing through the interior thereof for operating said elements to cause them to press against the inner surface of the stocking on the form.

2. In an apparatus for testing stockings, the combination of a contoured leg form, means for applying stress longitudinally of the form to a stocking thereon, including a series of presser members located at fixed points along the form and having stocking contacting faces extending over substantial circumferential arcs of the form, actuating means partly within the form operatively connected to each of said series of presser members, and means for operating each of the actuating means to thrust said members outwardly from the form to stress a stocking thereon.

3. In an apparatus for testing stockings, the combination of a naturally contoured hollow leg form, a series of presser members extending each circumferentially of the form and all lying in an approximately straight line along the front of said form, said presser members being arranged at fixed points in longitudinally spaced zones, actuating means partly within the form connected to each of said series of presser members, and means for operating said actuating means to cause at least one member in each zone to simultaneously press against the inside of a stocking with a predetermined thrust.

4. In an apparatus for testing stockings, the the combination of a naturally contoured hollow leg form, a series of presser members extending in an approximately straight line along said form, said presser members being arranged in longitudinally spaced zones in one of which there are a plurality of said presser members, and operating means at least partly within said form and operatively connected to the members for moving said members outwardly from a position in which they lie in contact with the surface of the form to a position in which they exert a stress on the stocking fabric, said operating means including a discriminating means for permitting only one of the said plurality of presser members in said one zone to operate at one time.

5. In a stocking testing apparatus, the combination of a naturally contoured leg form, a series of presser members arranged along the length of the form and including a presser member relatively adjacent the lower end of the foot, one approximately at the instep, one approximately at the angle, one approximately at the knee and at least one in the zone of the form normally contacted by the welt of the stocking being tested, and mechanically operated means operatively connected to the presser members for urging said presser members into engagement with the stocking fabric.

6. In a stocking testing apparatus, the combination of a naturally contoured leg form, a series of presser members arranged along the length of the form and each having a stocking contacting face extending over a substantial circumferential arc of the form, said members including one relatively adjacent the lower end of the foot, one approximately at the instep, one approximately at the ankle, one approximately at the knee and at least one in the zone of the form normally contacted by the welt of the stocking being tested, and mechanically operated means operatively connected to the presser members for simultaneously moving said presser members including one in said welt zone from positions in contact with the form to positions against the inner face of a stocking on the form to test the stocking.

7. In a stocking testing apparatus, the combination of a naturally contoured leg form, means for applying a stress to a stocking on the form in the longitudinal direction of the stocking, a series of presser members arranged along the front of the form and having stocking contacting faces extending over substantial circumferential arcs of the form, said series of members including one relatively adjacent the lower end of the foot, one approximately at the instep, one approximately at the ankle, one approximately at the knee and a plurality in the zone of the form normally contacted by the welt of the stocking being tested, a plunger connected to each of said members, and motor means operatively connected to the plungers for actuating said plungers to move said presser members outwardly from positions substantially in contact with the form and thrusting them against the inner surface of the stocking on the form.

8. In a stocking testing apparatus, the combination of a naturally contoured hollowed leg form, a series of presser members arranged along the length of said form, plunger members passing through the walls of the form and to the outer ends of which said members are fixed, a weight for each of said plunger members, trains of mechanism connected to the weights and plunger members for transmitting movements of said weights to the plungers to move the presser members outwardly from the outer surface of the form, a register member for each of the plungers and operated thereby from zero to a registering position, means cooperating with the weights to restore said weights and plungers to their original positions, and means in cooperative relationship to the register members for restoring said register members to their zero positions.

9. In an apparatus for testing stockings, the combination of a leg form, a series of presser members extending along the length of said form for placing circumferential stresses on the fabric of a stocking on the form, said members being arranged in several zones in one of which there are a plurality of said members, means for moving said members outwardly from the surface of the form, said means comprising weights connected to each of said members, a main latch holding all of said weights in inoperative positions, an additional latch for each of the weights for the members in said one zone, and push buttons each in cooperative relationship with one of said additional latches and with said main latch whereby operation of each of said push buttons releases its associated additional latch and said main latch.

10. In an apparatus for testing stockings, the combination as set forth in claim 9 together with means operated by any selected one of the push buttons to lock the remaining and unselected push buttons against accidental and unwanted movement.

11. In an apparatus for testing stockings, the combination as set forth in claim 9 together with an element connected to each of the additional latches and adapted to be actuated by the push buttons for transmitting impulses from the buttons to the additional latches and for also transmitting impulses to said main latch, said elements formed with hook portions all lying in the path of said main latch when the presser members are inactive but each swung out of the way of the main latch when it is moved by a push button, said main latch moving when it is actuated into the hook portions of the unselected elements and thereby latching them.

12. In an apparatus for testing stockings, the combination of a leg form to receive a stocking to be tested, a series of presser members mounted for movement outwardly of the form and having stocking contacting faces, weight means connected to each of the presser members for thrusting said members outwardly to stress a stocking on the form, and shock absorber means cooperating with the weight means for initially retarding the movement of said weight means to reduce the impact of said presser members against the stocking.

13. In a stocking testing apparatus having a form for receiving a stocking to be tested, the combination of a series of weights, means to support said weights for pivotal movement about an axis, means including a wheel for each of the weights for transmitting to zones of the stocking forces produced by gravity induced movements of the weights, and an impact reducing means acting on said wheels comprising an auxiliary shaft to which said wheels are cooperatively connected, and shock absorber means acting on said auxiliary shaft to oppose the turning moment of said wheel produced by said weights more strongly at the start of their movements than later.

14. In a stocking testing apparatus, the combination as set forth in claim 13 and in which the impact reducing means includes a cam for each of said wheels fixed on the auxiliary shaft, a follower for each of said cams on said wheels, a lever on said shock absorber, an additional cam member on said auxiliary shaft, a follower on said lever, and a weight on the lever acting to hold said follower on said lever in engagement with said cam member.

15. In a stocking testing apparatus, the combination of a hollow leg form, a series of plungers extending through the walls of said form substantially perpendicular to the outer surface thereof, blocks supported from the inner face of the wall of the form and having openings through which said plungers extend, motor means, means operatively connecting said motor means to said plungers, and weight means operating said motor means and connecting means to reciprocate said plungers.

16. In an apparatus for testing stockings, the combination of a hollow leg form, a plurality of presser members in said leg form for applying circumferential stresses on different parts of the fabric of a stocking on the form, each of said presser members including a portion to contact said fabric and a portion extending into the interior of said leg form, and means for operating said presser members comprising a motor wheel connected to each of said presser members, means for operating said motor wheels, means for latching said motor wheels against the action of said operating means, and means for operating said latching means to release said motor wheels.

17. In an apparatus for testing stockings, the combination of a hollow leg form, a plurality of presser members in said leg form for applying circumferential stresses on different parts of the fabric of a stocking on the form, each of said presser members including a portion to contact said fabric and a portion extending into the interior of said leg form, means for registering the action of said presser members on said fabric, and for operating said presser members and registering means comprising a motor wheel connected to each of said presser members, means connecting said motor wheels to said registering means, means for operating said motor wheels, means for latching said motor wheels against the action of said operating means, and means for operating said latching means to release said motor wheels.

18. In a stocking testing apparatus, the combination of a hollow leg form, a series of presser members in the form and arranged along the length of said form, said presser members including elements extending into the interior of the form, motor means operatively connected to said presser members interiorly of the form, means for operating said motor means for moving said presser members to place a testing stress on the fabric of a stocking on the form, a register having an indicator member for each of the presser members, means operatively connected to said motor means for movement therewith for actuating said indicator members from zero to registering positions, and means in cooperative relationship with the indicator members for restoring said indicator members to their zero positions.

19. In a stocking testing apparatus, the combination of a hollow leg form, a series of presser members in the form and arranged along the length of the form, said presser members including elements extending into the interior of the form, motor means operatively connected to said presser members interiorly of the form, means for operating said motor means for moving said presser members to place a testing stress on the fabric of a stocking on the form, a register having an indicator member for each of the presser members, said indicator members being movable about an axis common to all of said indicator members, levers operatively connected to said motor means and movable thereby about said axis for actuating said indicator members from zero to registering positions, and means in co-operative relationship with the indicator members for restoring said indicator members to their zero positions.

References Cited in the file of this patent

UNITED STATES PATENTS

| Number | Name | Date |
|---|---|---|
| 1,467,853 | Heinold | Sept. 11, 1923 |
| 2,066,310 | Appel et al. | Jan. 5, 1937 |
| 2,066,311 | Appel et al. | Jan. 5, 1937 |
| 2,260,146 | Logan | Oct. 21, 1941 |
| 2,315,181 | Baagoe | Mar. 30, 1943 |
| 2,369,661 | Dangelmajer | Feb. 20, 1945 |
| 2,540,222 | Tilton | Feb. 6, 1951 |

FOREIGN PATENTS

| Number | Country | Date |
|---|---|---|
| 120,120 | Switzerland | May 2, 1927 |